(12) United States Patent
Biewenga

(10) Patent No.: US 9,883,767 B2
(45) Date of Patent: Feb. 6, 2018

(54) BEVERAGE CARTRIDGE

(71) Applicant: Koninklijke Douwe Egberts B.V., Utrecht (NL)

(72) Inventor: Tjasse Willem Biewenga, Bilthoven (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 771 days.

(21) Appl. No.: 14/511,835

(22) Filed: Oct. 10, 2014

(65) Prior Publication Data
US 2015/0020689 A1 Jan. 22, 2015

Related U.S. Application Data

(63) Continuation of application No. 13/427,491, filed on Mar. 22, 2012, now Pat. No. 9,648,980, which is a
(Continued)

(30) Foreign Application Priority Data

Sep. 24, 2009 (EP) ..................................... 09171273

(51) Int. Cl.
*A47J 31/40* (2006.01)
*A47J 31/46* (2006.01)
(Continued)

(52) U.S. Cl.
CPC ............. *A47J 31/46* (2013.01); *A47J 31/401* (2013.01); *A47J 31/407* (2013.01); *A47J 31/41* (2013.01); *B67D 7/02* (2013.01); *B67D 7/62* (2013.01)

(58) Field of Classification Search
CPC ........ A47J 31/401; A47J 31/407; A47J 31/46; A47J 31/41; B67D 7/02; B67D 7/62
(Continued)

(56) References Cited

U.S. PATENT DOCUMENTS 4,520,950 A * 6/1985 Jeans ................... B67D 1/0021
137/212
5,464,120 A * 11/1995 Alpers ................... A23G 9/228
222/1

(Continued)

FOREIGN PATENT DOCUMENTS

CN 101389564 3/2009
EP 0 250 003 12/1987
(Continued)

OTHER PUBLICATIONS

Certificate of Patent Granted to Koninklijke Douwe Egberts B.V. from South African Patent Office with Specification and Form P2 for Patent No. 2012/02108, dated May 29, 2013, 28 pages.
(Continued)

*Primary Examiner* — Eric Stapleton
(74) *Attorney, Agent, or Firm* — Foley & Lardner LLP

(57) ABSTRACT

A beverage cartridge for use in a beverage dispensing system, comprising a housing, and located within the housing, a container for accommodating a beverage-related fluid substance and a pump; a drive port via which a driving torque may be delivered to the pump; and a fluid outlet port via which the fluid substance may be pumped from the cartridge; wherein the fluid outlet port and the drive port are located on the same side of the housing.

11 Claims, 4 Drawing Sheets

Related U.S. Application Data continuation of application No. PCT/NL2010/050623, filed on Sep. 24, 2010.

(51) Int. Cl.
*A47J 31/41* (2006.01)
*B67D 7/02* (2010.01)
*B67D 7/62* (2010.01)

(58) Field of Classification Search
USPC .......................................................... 99/295
See application file for complete search history.

(56) References Cited

U.S. PATENT DOCUMENTS

| | | | | |
|---|---|---|---|---|
| 5,588,557 A * | 12/1996 | Topar | ............... | B67D 7/08 222/129.1 |
| 5,735,436 A * | 4/1998 | Schroeder | ............ | B67D 1/0021 222/129.1 |
| 5,931,343 A * | 8/1999 | Topar | ............... | A47J 31/401 222/129.3 |
| 6,234,354 B1 * | 5/2001 | Phillips | ............... | B67D 1/0021 222/129.1 |
| 6,330,850 B1 * | 12/2001 | Rosse | ................. | A47J 31/40 222/129.1 |
| 6,389,962 B1 * | 5/2002 | Han | ................. | A23G 9/28 222/146.6 |
| 6,428,689 B1 * | 8/2002 | Kameyama | ......... | C02F 1/46104 204/228.1 |
| 6,622,064 B2 * | 9/2003 | Bartholomew | ........ | A45D 29/00 222/144 |
| 6,856,861 B2 * | 2/2005 | Dirksing | ............... | A45D 40/00 700/233 |
| 6,890,161 B2 * | 5/2005 | Paukovits, Jr. | ....... | F04B 23/026 222/325 |
| 7,111,759 B1 * | 9/2006 | Gorski | ................. | B67D 1/0021 222/145.6 |
| 7,331,483 B2 * | 2/2008 | Bhimani | ............... | B67D 1/0025 222/1 |
| 7,472,805 B2 * | 1/2009 | Nighy | ................. | B67D 1/0025 222/129.1 |
| 7,648,049 B1 * | 1/2010 | Lassota | ................. | A47J 31/401 222/129.1 |
| 7,997,448 B1 * | 8/2011 | Leyva | ................. | B67D 1/0044 222/1 |
| 8,070,019 B2 * | 12/2011 | Stettes | ................. | A47J 31/401 222/1 |
| 8,091,735 B2 * | 1/2012 | Girard | ................. | A47J 31/402 222/105 |
| 8,224,481 B2 * | 7/2012 | Bylsma | ............... | A61M 5/1413 222/129.4 |
| 8,893,927 B2 * | 11/2014 | Olson | ................. | B01F 5/0496 222/162 |
| 8,926,074 B2 * | 1/2015 | Morino | ................. | B41J 2/1752 347/86 |
| 2003/0012849 A1 * | 1/2003 | Berson | ................. | A23L 2/54 426/66 |
| 2003/0033938 A1 * | 2/2003 | Halliday | ............. | A47J 31/4492 99/275 |
| 2003/0210985 A1 * | 11/2003 | Feygin | ..................... | B67D 7/00 417/46 |
| 2005/0031688 A1 * | 2/2005 | Ayala | ................... | A61K 9/1611 424/473 |
| 2006/0006107 A1 * | 1/2006 | Olson | .................. | B67D 1/0004 210/198.1 |
| 2006/0278093 A1 * | 12/2006 | Biderman | ............... | A47J 31/40 99/282 |
| 2007/0164046 A1 * | 7/2007 | Nighy | .................. | B67D 1/0025 222/129.1 |
| 2008/0149669 A1 * | 6/2008 | Nicholson | ........... | B67D 1/0025 222/129.1 |
| 2008/0173705 A1 * | 7/2008 | Girard | ................... | A47J 31/402 235/375 |
| 2008/0283550 A1 * | 11/2008 | Nighy | ................. | F04B 43/0736 222/1 |
| 2009/0007792 A1 * | 1/2009 | Glucksman | ......... | A47J 31/4407 99/282 |
| 2009/0041840 A1 * | 2/2009 | Ayala | ................... | A61K 9/1611 424/457 |
| 2010/0193544 A1 * | 8/2010 | Rusch | ...................... | B67B 7/28 222/82 |
| 2011/0285798 A1 * | 11/2011 | Matsuo | .................. | B01F 11/04 347/86 |

FOREIGN PATENT DOCUMENTS

| | | |
|---|---|---|
| EP | 0 638 486 | 2/1995 |
| EP | 0 749 713 | 12/1996 |
| EP | 1 440 640 | 7/2004 |
| EP | 1 806 314 | 7/2007 |
| EP | 2 085 352 | 8/2009 |
| EP | 2 085 353 | 8/2009 |
| FR | 2672279 | 8/1992 |
| JP | 07-075613 | 3/1995 |
| JP | 52-005613 | 3/1995 |
| JP | H52-005613 | 3/1995 |
| WO | WO-2009/106598 A1 | 9/2009 |

OTHER PUBLICATIONS

Chinese Office Action and Search Report and Translation thereof for Chinese Application No. 201080042675.2, dated May 23, 2013, 9 pages.
English Translation of Office Action received in Mexican Patent Application No. MX/A/2012/003478, no date, 2 pages.
English Translation of Second Office Action received in Chinese Patent Application No. 201080042675, no date, 7 pages.
English Translation of Supplementary Search Report for Chinese Patent Application No. 201080042675, dated Mar. 21, 2014, 2 pages.
European Search Report for European Application No. 13177242.8, dated Aug. 28, 2013, 9 pages.
International Search Report for International Application No. PCT/US2010/050623, dated Dec. 27, 2010, 3 pages.
Notice of Acceptance for New Zealand Patent Application No. 598937, dated Mar. 5, 2014, 1 page.

* cited by examiner

BEVERAGE CARTRIDGE

CROSS-REFERENCE TO RELATED PATENT APPLICATIONS

This application is a continuation of U.S. application Ser. No. 13/427,491, filed Mar. 22, 2012, which is a continuation of International Patent Application No. PCT/NL2010/050623, filed Sep. 24, 2010; which claims priority to European Application No. EP09171273.7 filed Sep. 24, 2009, all of which are incorporated herein by reference in their entireties.

BACKGROUND

The present invention relates to a beverage cartridge for use in a beverage dispensing system and to a beverage dispensing system per se.

It is well known that beverage dispensing machines make use of beverage-related fluid substances that are used in the preparation of a beverage for a user. The fluid substance may include but are not limited to coffee extracts, tea extracts, chocolate beverages or concentrates for their preparation, milk, flavors and the like. The beverage-related fluid substances are supplied to the dispensing machines in beverage cartridges. Since a dispensing machine will typically carry a range of beverage cartridges and a heavily used dispensing machine will need to be frequently re-stocked, the design of the mechanical interface between a beverage cartridge and the dispensing machine is a key design concern.

The present invention aims generally to address such concerns.

EP 1806314 discloses a beverage package that is removably dockable to a beverage dispensing machine. The beverage package comprises a container for a base liquid and a mixing device having an in-built pump. The pump is driven from the dispensing machine and the prepared beverage exits the mixing device from an outlet at the bottom of the mixing device.

SUMMARY

With this background in mind, according to a first aspect, the present invention may provide a beverage cartridge for use in a beverage dispensing system, comprising:
a housing, and located within the housing, a container for accommodating a beverage-related fluid substance and a driven element;
a drive port via which a driving torque may be delivered to the driven element; and
a fluid outlet port via which the fluid substance may be expelled from the cartridge;
wherein the fluid outlet port and the drive port are located on the same side of the housing.

By locating the required input (drive) port and the required output (fluid) port on the same side of the housing, the present invention enables both the couplings connecting the cartridge to a dispenser to be relatively short, direct couplings which is beneficial in terms of simplicity of design and reliability.

According to a second aspect, the present invention may provide a beverage dispensing system, comprising:
a beverage cartridge according to the first aspect of the invention; and
a dispenser comprising a dispensing assembly having a mixer;
wherein the system comprises a drive coupling for transmitting torque from the dispensing assembly to the driven element and a fluid coupling for conveying fluid substance from the container to the dispensing assembly.

Preferably, the drive coupling has a longitudinal axis and the fluid coupling has a longitudinal axis, and said longitudinal axes are substantially parallel.

By providing parallel couplings which are located on the same side of the housing, the design of the dispensing assembly may be compact (as compared with a system in which the couplings are connected via different sides of the cartridge). In addition, the present invention enables the dispenser and cartridge to be connected by a push-fit arrangement in which the push direction is in the direction of the longitudinal axes of the couplings.

The fluid coupling may comprise a dispenser connection part and a cartridge connection part, and the drive coupling may comprise a dispenser connection part and a cartridge connection part. For either coupling, the junction between the dispenser connection part and the cartridge connection part may be inside the housing cartridge, outside the cartridge housing or at the respective port. Further, for either coupling, either the dispenser connection part may be a male part and the cartridge connection part a female part, or vice versa.

In a preferred embodiment, the cartridge connection part of the fluid coupling and the cartridge connection part of the drive coupling both project from their associated ports.

It is further preferred that the driven element is a pump for expelling and dosing the fluid substance from the cartridge. In this regard the pump advantageously is a rotating volumetric pump, such as a gear pump. Conveniently thereby rotation of the drive coupling by a drive unit in the dispenser provides the driving torque to rotate the pump located within the housing of the beverage cartridge.

BRIEF DESCRIPTION OF THE DRAWINGS

Exemplary embodiments of the invention are hereinafter described with reference to the accompanying drawings, in which.

DETAILED DESCRIPTION

Figure 1:
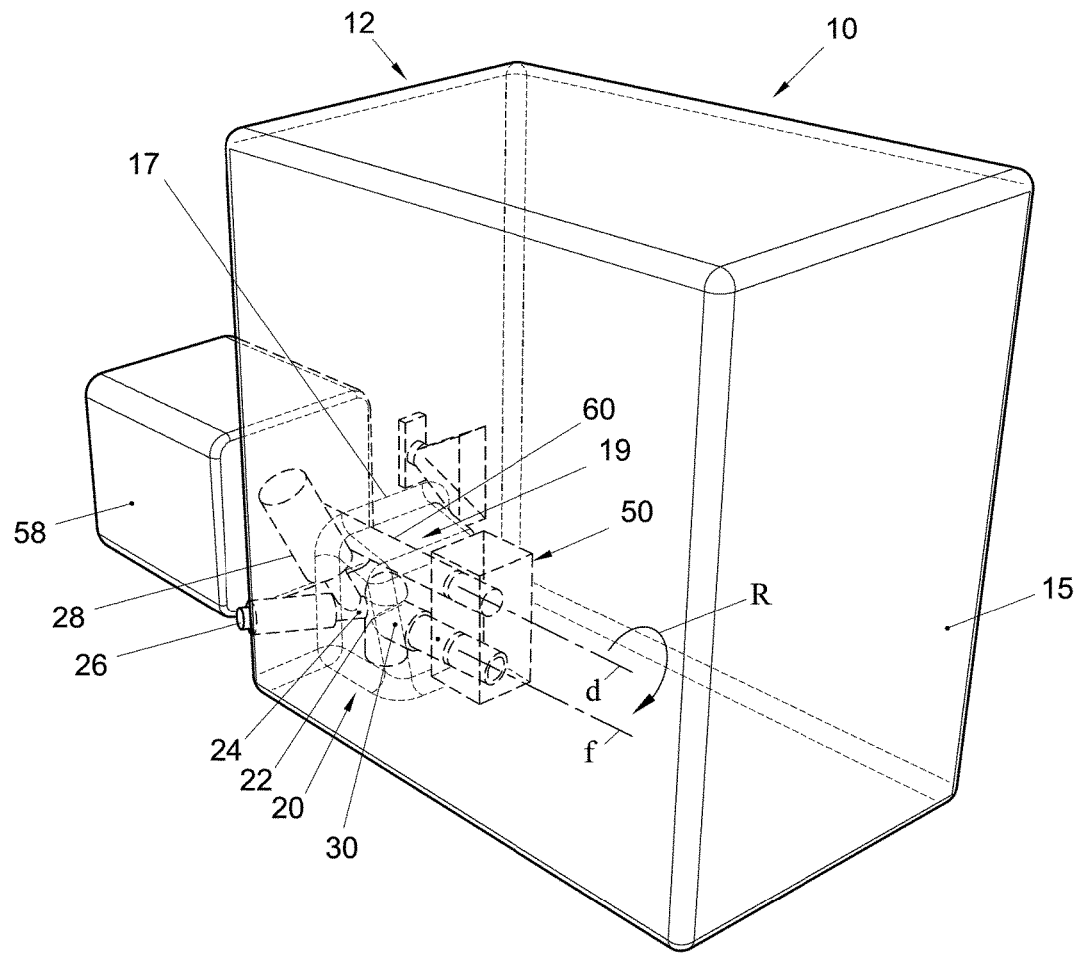
FIG. 1 shows a schematic perspective view of a first beverage dispensing system.

A first beverage dispensing system 10 is shown in FIG. 1. The system 10 comprises a dispenser 12 having a housing 15. The housing 15 comprises a chamber 17 which opens to the exterior of the housing 15. The dispenser 12 further comprises a dispensing assembly generally designated 19. The dispensing assembly 19 comprises a water jet mixer 20 having a central mixing region 22 that has an inlet 24 to which hot water is supplied by a variable rate nozzle 26. The supply of water from the nozzle 26 to the mixing region 22 is regulated by an air actuator 28. The mixer 20 further comprises an inlet conduit 30 having a longitudinal axis f via which a beverage-related fluid substance is supplied as described in more detail below. The mixer 20 further comprises an outlet 32 via which a prepared beverage is dispensed. The dispensing assembly 19 further comprises a drive unit 58, comprising a motor, having a rotating drive axle 60 having a longitudinal axis d. As can be more clearly seen in FIGS. 2(a) and 2(b), the dispensing assembly 19 is disposed mainly outside of the housing 15 and the chamber 17 with only the drive axle 60 and the inlet conduit 30 extending deeply into the chamber 17 and passing through apertures in a rear wall 17a of the chamber 17.

The system 10 further comprises a disposable beverage cartridge 50. The cartridge 50 comprises an external housing 52 shaped like a regular, six-faced, oblong box. The cartridge 50 further comprises, located within the housing 52, a container (not shown) which accommodates a beverage-related fluid substance. The beverage-related fluid substance may comprise coffee extracts, tea extracts, chocolate concentrates or ready-to-drink fluid substances like milk. The cartridge 50 further comprises, located within the housing 52, a pump (not shown). Such pumps are conventional, but in conjunction with the present invention a positive volumetric displacement pump is preferred to enable accurate dosing. One of the faces designated 52a of the housing 52 is provided with a drive port 53a and a fluid outlet port 53b. The pump comprises a female drive connection part (not shown) which is adapted to receive the end of the drive axle 60. The positive displacement pump therefore is advantageously a rotating volumetric pump, such as a gear pump. The cartridge 50 further comprises a female fluid connection part (not shown) which is adapted to receive the end of the inlet conduit 30.

The cartridge 50 may be connected to the dispensing assembly 19 by first positioning the cartridge 50 such that the drive axle 60 is in alignment with the drive port 53a, and the inlet conduit 30 is in alignment with the fluid outlet port 53b and then moving the cartridge 50 towards the dispensing assembly 19 along the axes f, d, whereby the drive axle 60 passes through the drive port 53a and is pushed into driving engagement with the female drive connection part of the pump, and the inlet conduit 30 passes through the fluid outlet port 53b and is pushed into engagement with the female fluid connection part of the container, thereby putting the mixer 20 into fluid communication with the container. Thereafter, when the drive unit 58 is activated, the drive axle 60 rotates in the direction indicated by the arrow R about its longitudinal axis d. The rotation of the axle 60 provides the driving torque to operate the pump which pumps the fluid substance from the cartridge 50 along the inlet conduit 30 to the dispensing assembly 19 where it is used in the preparation of a beverage. Preferably therefore the fluid substance is pumped in an accurate amount, so as to precisely dose it into the mixer 20.

It will be appreciated that by designing the cartridge 50 such that the external mechanical connections necessary for its operation are localized to the same side of the housing 15, the couplings between the dispenser assembly 19 and the cartridge 50 can be kept relatively short and direct which is beneficial in terms of design and reliability of those couplings, particularly the drive coupling. In addition, since the couplings both extend in one direction (along parallel axes), not only do the couplings themselves occupy a limited space, but they permit and encourage a compact design of the dispensing assembly 19 too. Furthermore, the parallel couplings enable the couplings to be established by a single push-fit operation connecting the constituent connection parts together substantially simultaneously.

Figure 2A:
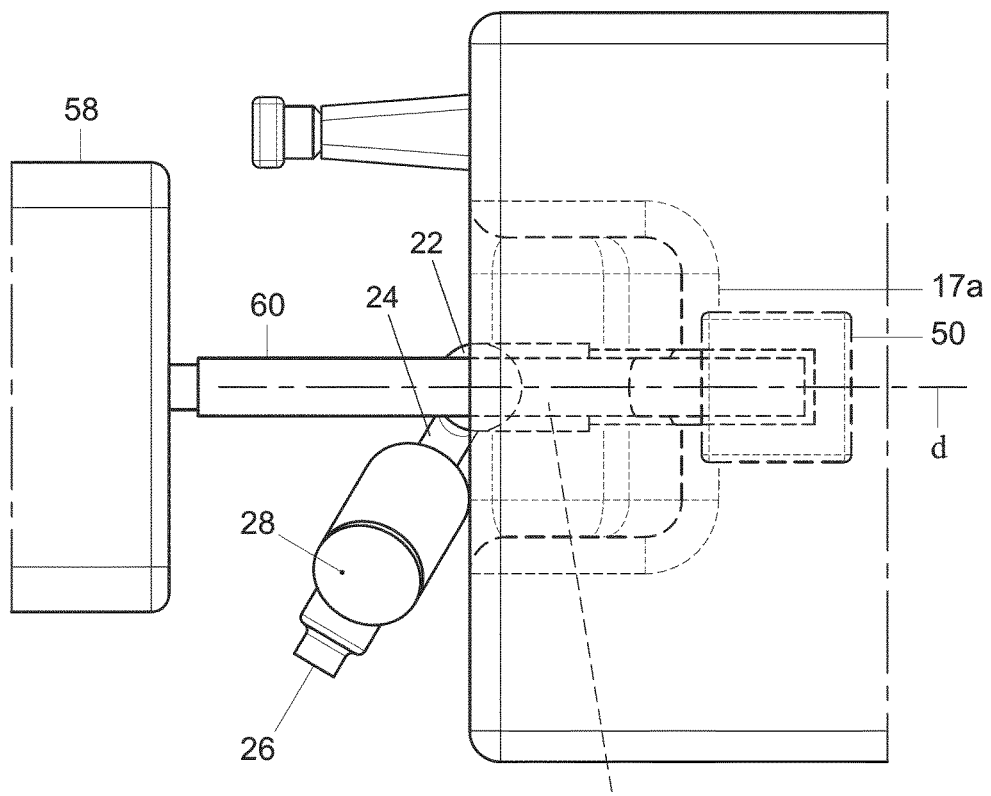
FIGS. 2(a) and 2(b) show a top view and side view, respectively, of FIG. 1.
Figure 2B:
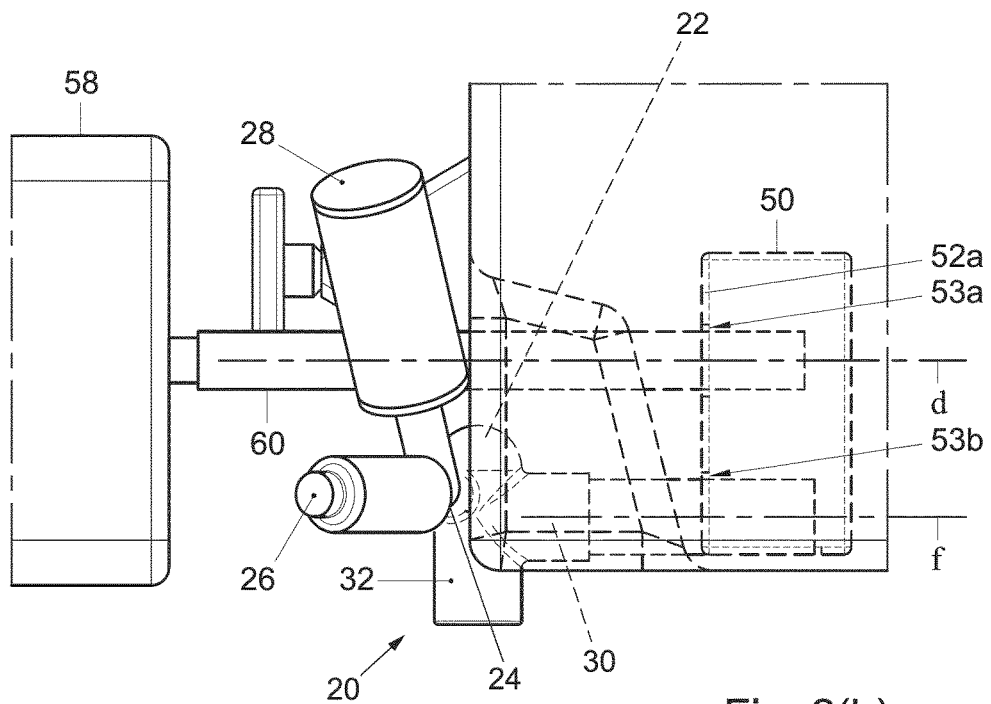

When subsequently, parts similar to those described in relation to the first beverage system shown in FIGS. 1, 2(a), (b) are referred to, the same reference numeral is used.

Figure 3A:
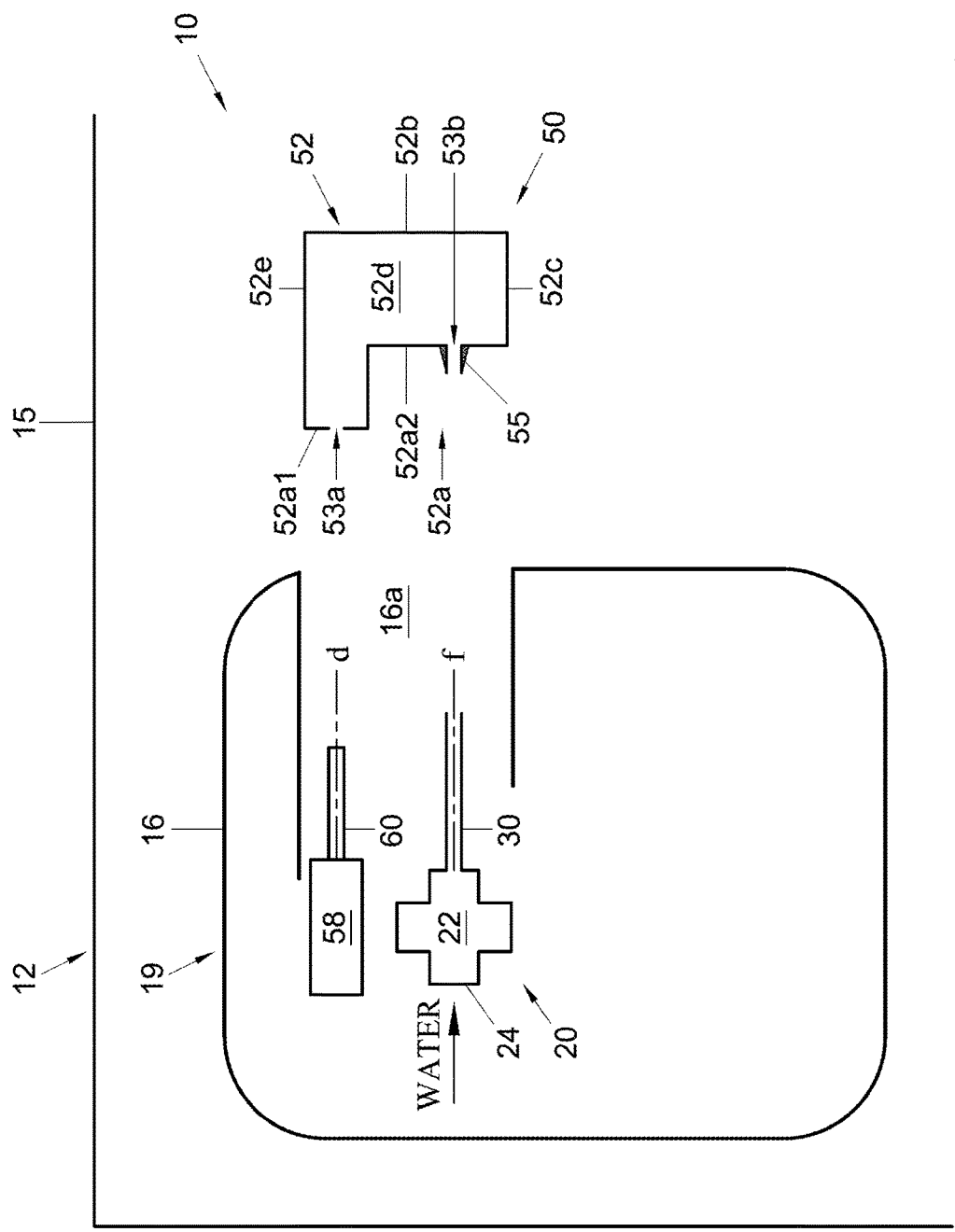
FIGS. 3(a) and 3(b) show schematic side views of a beverage cartridge before and after connection to a dispensing assembly in a second beverage dispensing system.

Parts of a second beverage dispensing system 10 are shown in FIGS. 3(a), (b). Referring to FIG. 3(a), the system 10 comprises a dispenser 12 having an exterior housing 15. The dispenser 12 comprises a plurality of dispensing assemblies 19, only one of which is shown by way of example. The dispensing assembly 19 is housed within an inner housing portion 16. The dispensing assembly 19 comprises a water jet mixer 20 having a central mixing region 22 that has an inlet 24 to which hot water is supplied and an inlet conduit 30 having a longitudinal axis f via which a beverage-related fluid substance is supplied as described in more detail later. The mixer 20 further comprises an outlet 32 via which a prepared beverage is dispensed. The dispensing assembly 19 further comprises a drive unit 58, comprising a motor, having a rotating drive axle 60 having a longitudinal axis d. The drive unit 58 and the mixer 20 are disposed to the rear of a recessed loading channel 16a formed in the inner housing portion 16 which opens to the interior of the housing 15. The longitudinal axes f, d of the inlet conduit 30 and the drive axle 60 extend along the longitudinal direction of the channel 16a.

Other details of the dispensing assembly 19 are similar to those described in relation to the first beverage dispensing system but have been omitted from the drawings for diagrammatic simplicity.

Figure 3B:
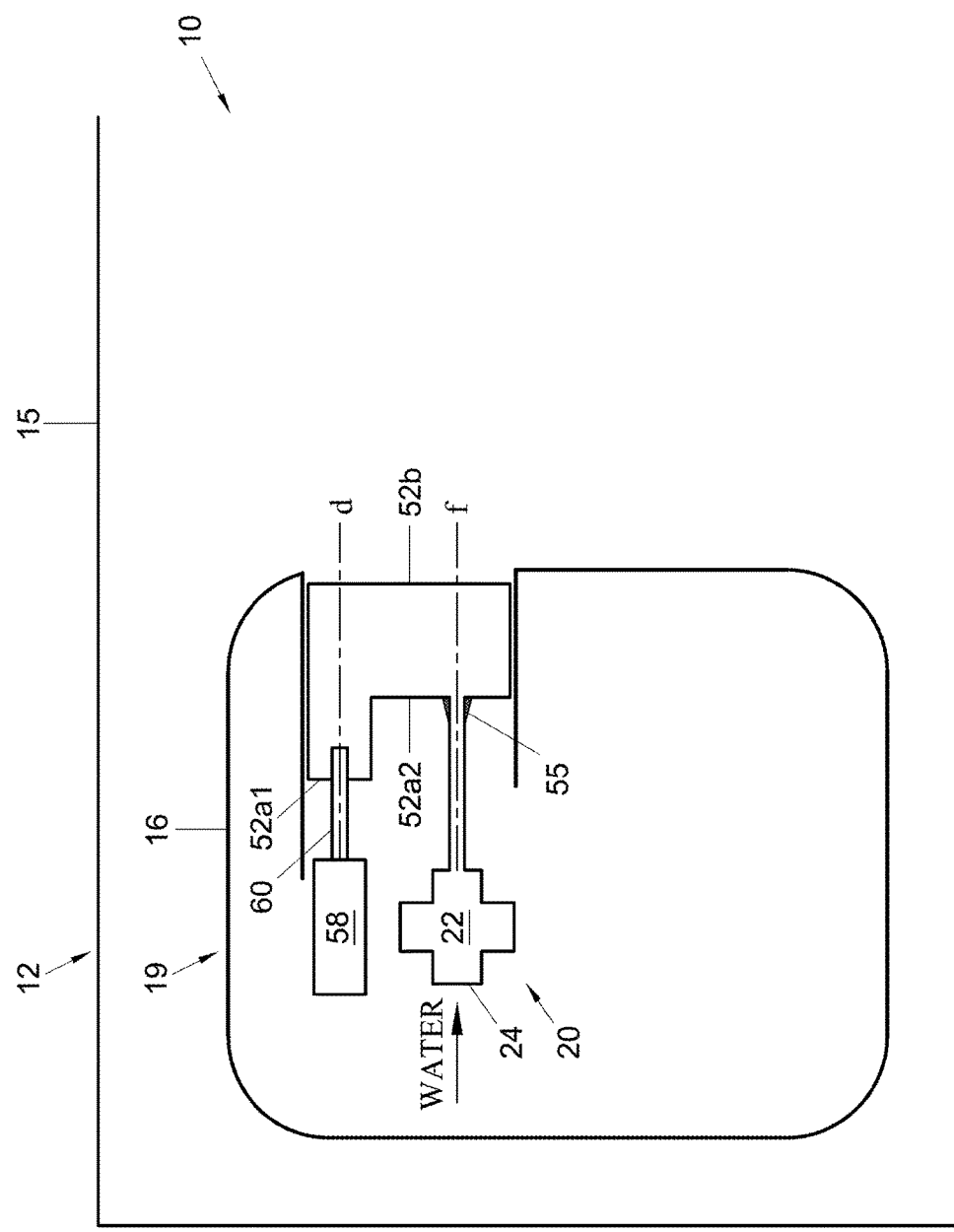

The system 10 further comprises a refillable beverage cartridge 50. The cartridge 50 comprises an external housing 52 having a leading side 52a, a trailing side 52b, and four lateral sides 52c-f. Lateral side 52f is not visible in FIGS. 3 (a), (b) and so the reference numeral does not appear in the drawings. The cartridge 50 further comprises, located within the housing 52, a container (not shown) which accommodates a beverage-related fluid substance. The cartridge further comprises, located within the housing 52, a pump (not shown). Such pumps are generally conventional, but for use in the present invention advantageously of the rotating volumetric displacement type. The leading side 52a comprises two faces 52a1, and 52a2. A drive port 53a is provided in the face 52a1, and a fluid outlet port 53b is provided in the face 52a2. The pump comprises a female drive connection part (not shown) which is adapted to receive the end of the drive axle 60. The cartridge 50 further comprises a female fluid connection part 55 which projects outwardly from the face 52a2 and is adapted to receive the end of the inlet conduct 30.

The cartridge 50 may be connected to the dispensing assembly 19 by first positioning the cartridge 50 as shown in FIG. 3(a) and then pushing the cartridge 50 via its trailing side 52b into the channel 16a. Since there is a close match between the outer dimensions and shape of the lateral sides 52c-f and the inner profile of the channel 16a, the cartridge 50 is snugly received within the channel 16a. Continued pushing of the cartridge 50 slides it into the position shown in FIG. 3(b) in which the drive axle 60 has passed through the drive port 53a into driving engagement with the female drive connection part of the pump, and the inlet conduct 30 has entered into engagement with the female fluid connection part 55 at the fluid outlet port 53b, thereby putting the mixer 20 into fluid communication with the container. Thereafter, when the drive axle 60 rotates in the direction indicated by the arrow R, a fluid substance from the cartridge 50 is pumped, and preferably in a dosed quantity, along the inlet conduct 30 to the dispensing assembly 19 where it is used in the preparation of a beverage.

It will be appreciated that such an arrangement allows an operator to load a fresh cartridge 50 simply by aligning the cartridge 50 with the loading channel 16a of one of the dispensing assemblies and then pushing it so that it slides into its operational position. Such a straightforward loading operation is readily achieved even in cramped conditions. As a result, the housing of a dispenser may be arranged to host a greater number of dispensing assemblies and the access to a given dispensing assembly may be relatively poor without placing too onerous a burden on the operator.

In other embodiments, instead of a pump, other types of driven element may be used. For example, in one embodiment, the fluid substance is stored with a pressurized head space and the driven element comprises a stirrer.

What is claimed is:

1. A beverage dispensing system, comprising:
   a beverage cartridge, including:
      a housing, and located within the housing, a container configured for accommodating a beverage-related fluid substance and a driven element;
      a drive port configured to deliver a driving torque to the driven element; and
      a fluid outlet port via which the fluid substance may be expelled from the cartridge;
      wherein the fluid outlet port and the drive port are located on the same side of the housing;
   a dispenser comprising a dispensing assembly having a mixer;
   a drive coupling for transmitting torque from the dispensing assembly to the beverage cartridge for driving the driven element; and
   a fluid coupling for conveying fluid substance from the container of the beverage cartridge to the dispensing assembly,
   wherein the drive coupling comprises a dispenser drive connection part and a cartridge drive connection part, associated with the drive port, and the fluid coupling comprises a dispenser fluid connection part and a cartridge fluid connection part, associated with the fluid outlet port,
   wherein a junction between each said dispenser drive and fluid connection parts and each said cartridge drive and fluid connection parts is outside the housing of the beverage cartridge, and
   wherein the dispensing assembly comprises a loading channel into which the beverage cartridge is pushed to establish said drive and fluid couplings.

2. The system of claim 1, wherein the drive port and the fluid outlet port are located on a single face of the housing.

3. The system of claim 1, wherein the drive port and the fluid outlet port are located on first and second faces of the housing on said same side of the housing.

4. The system of claim 1, wherein each of said connection parts is elongate having a longitudinal axis, and said connection parts project from their associated ports such that their respective longitudinal axes are parallel to one another.

5. The system of claim 1, wherein the driven element is a pump for expelling the fluid substance from the cartridge.

6. The system of claim 5, wherein the pump is a rotating volumetric pump, such as a gear pump.

7. The system of claim 1, wherein the drive coupling has a longitudinal axis and the fluid coupling has a longitudinal axis, and said longitudinal axes are parallel.

8. The system of claim 1, wherein the cartridge connection part of the fluid coupling and the cartridge connection part of the drive coupling both project from their associated drive and fluid outlet ports.

9. The system of claim 1, wherein the housing has four lateral sides.

10. The system of claim 9, wherein there is a close match between outer dimensions and shape of the lateral sides and an inner profile of the channel, so that the cartridge is snugly received within the channel.

11. The system of claim 1, wherein rotation of the drive coupling by a drive unit in the dispenser provides the driving torque to rotate through an axle the driven element.

* * * * *